United States Patent
Neunzig et al.

(10) Patent No.: US 10,454,333 B2
(45) Date of Patent: Oct. 22, 2019

(54) ACTUATOR

(71) Applicant: CONTINENTAL AUTOMOTIVE GMBH, Hannover (DE)

(72) Inventors: Dirk Neunzig, Rosbach (DE); Harald Frey, Bad Soden (DE); Charalampos Kiorktsidis, Sulzbach (DE); Vinzent Kremina, Frankfurt (DE); Michael Noll, Königstein (DE); Peter Kohlen, Neu Anspach (DE); Jörg Reif, Butzbach (DE); Calin Opre, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/651,561

(22) PCT Filed: Dec. 12, 2013

(86) PCT No.: PCT/EP2013/076416
§ 371 (c)(1),
(2) Date: Jun. 11, 2015

(87) PCT Pub. No.: WO2014/090953
PCT Pub. Date: Jun. 19, 2014

(65) Prior Publication Data
US 2015/0326089 A1 Nov. 12, 2015

(30) Foreign Application Priority Data

Dec. 14, 2012 (DE) .................. 10 2012 223 288

(51) Int. Cl.
*H02K 5/08* (2006.01)
*H02K 7/116* (2006.01)
(Continued)

(52) U.S. Cl.
CPC ............... *H02K 5/08* (2013.01); *H02K 7/116* (2013.01); *H02K 9/22* (2013.01); *H02K 11/33* (2016.01)

(58) Field of Classification Search
CPC ........ H02K 5/08; H02K 7/116; H02K 7/1163; H02K 7/1166; H02K 11/30; H02K 11/35; H02K 11/38; H02K 9/22
(Continued)

(56) References Cited

U.S. PATENT DOCUMENTS

| 5,937,507 | A | 8/1999 | Asakura et al. |
| 6,232,684 | B1 * | 5/2001 | Haag ............... E05B 81/06 |
| | | | 292/201 |

(Continued)

FOREIGN PATENT DOCUMENTS

| CN | 102223023 | 10/2011 |
| CN | 102570720 | 7/2012 |

(Continued)

OTHER PUBLICATIONS

Ono et al., Machine Translation of JP11356006, Dec. 1999.*
(Continued)

*Primary Examiner* — Quyen P Leung
*Assistant Examiner* — Eric Johnson
(74) *Attorney, Agent, or Firm* — Cozen O'Connor

(57) ABSTRACT

An actuator includes a metal housing that consists of multiple housing parts, an electric motor, an actuating member, a transmission mechanism that adapts the movement of the electric motor to the actuating member and an electronic system for controlling the electric motor. A heat sink is situated in a housing part consisting of plastic, said heat sink being connected to a metal housing part.

9 Claims, 5 Drawing Sheets

(51) Int. Cl.
  *H02K 9/22* (2006.01)
  *H02K 11/00* (2016.01)
  *H02K 11/33* (2016.01)
(58) Field of Classification Search
  USPC .................................................. 310/43, 64
  See application file for complete search history.

(56) References Cited

U.S. PATENT DOCUMENTS

| | | | |
|---|---|---|---|
| 7,207,187 B2 * | 4/2007 | Funahashi | F01C 21/10 62/113 |
| 8,564,161 B1 | 10/2013 | Yamasaki | |
| 8,659,198 B2 | 2/2014 | Inoue | |
| 9,318,935 B2 | 4/2016 | Nakagami et al. | |
| 2004/0232787 A1 | 11/2004 | Kopf et al. | |
| 2006/0181162 A1 | 8/2006 | Pierret et al. | |
| 2007/0164621 A1 * | 7/2007 | Kano | H02K 5/225 310/71 |
| 2009/0246047 A1 * | 10/2009 | Hattori | H02K 11/01 417/410.1 |
| 2011/0254388 A1 | 10/2011 | Yamasaki | |
| 2011/0256002 A1 * | 10/2011 | Ikeda | F04B 35/04 417/410.1 |
| 2012/0319511 A1 * | 12/2012 | Kifer | H02K 3/522 310/71 |
| 2013/0033098 A1 * | 2/2013 | Nagashima | B60T 7/042 303/199 |
| 2013/0257194 A1 | 10/2013 | Yamasaki | |
| 2014/0070643 A1 | 3/2014 | Motoishi | |

FOREIGN PATENT DOCUMENTS

| | | |
|---|---|---|
| DE | 20320643 | 12/2004 |
| DE | 102011002007 | 12/2011 |
| JP | H11-356006 | 12/1999 |
| JP | 2003-324903 | 11/2003 |
| JP | 2009257292 A * | 11/2009 |
| JP | 2011-229228 | 11/2011 |
| JP | 2012 092747 | 5/2012 |
| JP | 2012-092747 | 5/2012 |
| KR | 101040141 | 6/2011 |

OTHER PUBLICATIONS

Yasuda, Machine Translation of JP2009257292, Nov. 2009.*
Office Action dated Oct. 9, 2016 which issued in the corresponding Chinese Patent Application No. 2013800641733.

* cited by examiner

ACTUATOR

CROSS REFERENCE TO RELATED APPLICATIONS

This is a U.S. national stage of application No. PCT/EP2013/076416, filed on Dec. 12, 2013. Priority is claimed on German Application No. DE102012223288.5, filed Dec. 14, 2012, the content of which is incorporated herein by reference.

BACKGROUND OF THE INVENTION

1. Field of the Invention

The invention relates to an actuator comprising a metal housing that includes of a plurality of housing parts, an electric motor, an actuating member, a transmission mechanism that adapts the movement of the electric motor to the actuating member, and an electronics system for controlling the electric motor.

Actuators that have an actuating member that is driven by an electric motor and that is provided in the form of a flap or a journal, or are used as actuators or valves in motor vehicles are known. The metal housings used are generally cast aluminum housings, since such housings have sufficient strength and relatively low weight. In order to introduce the components into the housing, said housing consists of two or more housing parts. Since actuators are generally exposed to high temperatures in motor vehicles, the aluminum casing consisting of a plurality of parts is used, on account of its good thermal conductivity, to cool the components arranged in the housing and/or to cool the heat released by the electric motor. With use of the actuator in the high-temperature range, it is also known to provide active cooling in the form of a water-cooling system in the housing. It is disadvantageous that the arrangement of a water-cooling system increases the cost for the aluminum housing significantly. In housings without water-cooling system, the housing parts must have relatively thick walls for sufficient thermal capacity in order to attain effective cooling. Such a housing has a relatively high weight.

SUMMARY OF THE INVENTION

An object of one embodiment of the invention is an actuator that is constructed in a simple and economical manner. In addition, the actuator should have a low weight.

In one embodiment of the invention, at least one housing part is plastic, in that a heat sink is arranged in the region of plastic the housing part, and the heat sink is connected to a metal housing part.

The arrangement of a separate heat sink enables the cooling of certain regions and/or components in the housing. Due to this additional cooling measure it is possible to form individual parts of the housing, preferably the lid, from other materials, in particular plastic. With the use of plastics, the use of plastics that are resistant to high temperatures can additionally be omitted on account of the heat sink, and instead more economical plastics can be used. The key advantage, however, lies in the fact that the actuator has a much lower weight due to the use of plastic.

Effective cooling is achieved when a metal body is used as heat sink. On account of the thermal conductivity of metals, these materials are better suited than other materials. An improved cooling or the use of a smaller metal body as heat sink is achieved in that the metal body contains at least one metal having good thermal conductivity, preferably copper or aluminum.

In a particularly advantageous embodiment the metal body is connected in one part to electrical conductor paths. This has the advantage that the arrangement of the metal body is facilitated and a particularly simple securing of the metal body in the housing is achieved. The most important advantages, however, lie in that the conductor paths generally consist of a material that is a good thermal conductor. Conductor paths are often produced by stamping or cutting from a blank. With appropriate arrangement and design of the metal body, this can be arranged in the regions that were originally stamped out or cut out. As a result of this improved material use of the blank, the waste can be considerably reduced. In addition, the metal body and conductor paths can be manufactured at the same time. A separate production of the metal body can thus be omitted. The heat sink can thus be produced very economically.

However, with separate production of conductor paths and metal body, a simple arrangement can be achieved in that the metal body is connected to the conductor paths by soldering.

In one embodiment the metal body can be connected to a plastic lid of the housing. In particular, latching and plug-in connections allow a simple installation. This connection may be provided in addition to a connection of the metal body to other components. On account of the insulating properties of the plastic lid, the connection can also be established via the conductor paths connected to the metal body.

The function as heat sink is further improved when the metal body has webs that are arranged in receptacles of the metal housing part to dissipate the heat into further housing parts. The receptacles may also be bearing surfaces on the housing. In addition the webs may be angled at any angle from the metal body to enable the connection to the metal housing.

To ensure a reliable heat dissipation into the housing under harsh operating conditions, the webs in accordance with an advantageous embodiment are formed such that they are arranged in the receptacles under preload. A preload is already achieved when the end of the web is bent in an L-shaped, U-shaped or V-shaped manner. The preload is generated here by the spring effect of the end. The preload can be provided in one embodiment by the form of the receptacle of the housing. For this purpose the receptacle may be formed with lead-in chamfers. Such a form additionally can be produced easily.

BRIEF DESCRIPTION OF THE DRAWINGS

The invention will be described in greater detail on the basis of an exemplary embodiment. In the drawings.

DETAILED DESCRIPTION OF THE PRESENTLY PREFERRED EMBODIMENTS

Figure 1:
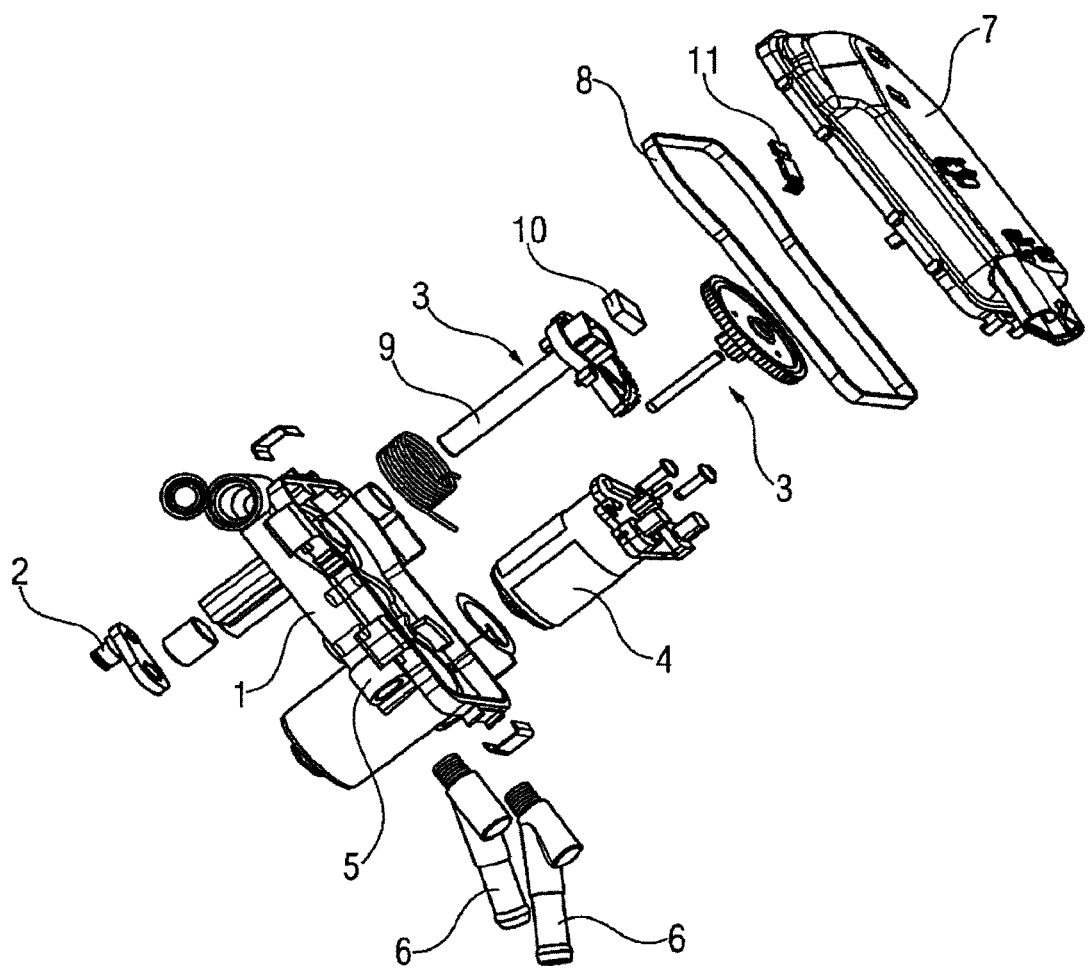
FIG. 1 is an exploded illustration of an actuator.

FIG. 1 shows part of an aluminum housing 1 of an actuator in a motor vehicle with an actuating member 2, which is driven by an electric motor 4 via a gear unit 3 as a transmission mechanism. The housing part 1 is watercooled. For this purpose a coolant channel 5 is connected to corresponding connection lines 6. The housing 1 is covered by a lid 7 in the region of the gear unit 3. For sufficient tightness, a seal 8 is provided between the housing 1 and lid 7. To detect a position of the actuating member 2, a magnet 10 is secured to the shaft 9 driving the actuating member 2. A sensor 11 is arranged opposite the magnet 10 and is in turn secured in the lid 7.

Figure 2:
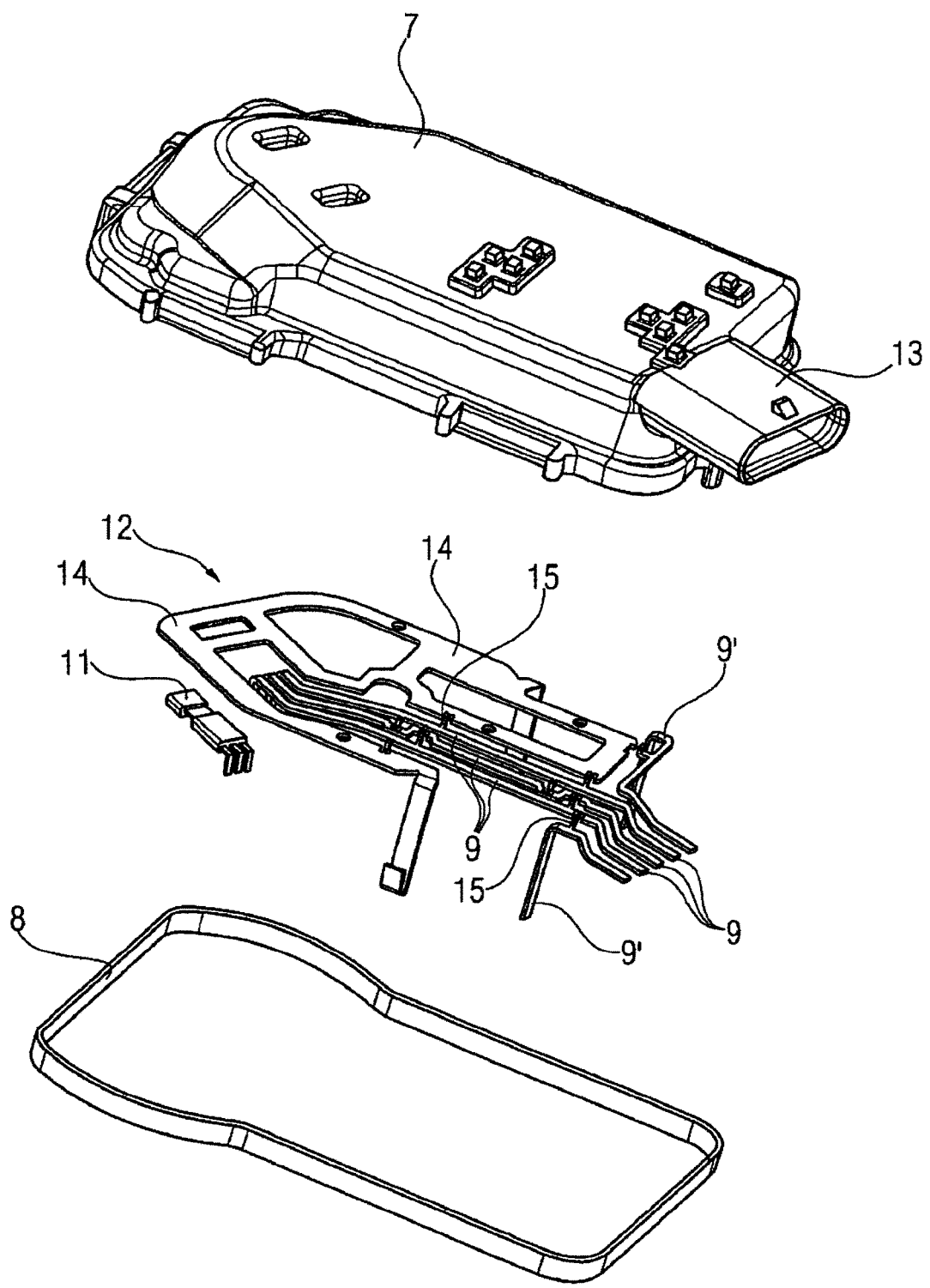
FIG. 2 is a lid with leadframe according to FIG. 1.

In FIG. 2 a leadframe 12 secured in the lid 7. The leadframe 10 includes conductor paths 9 for contacting the sensor 11 and conductor paths 9' for contacting the electric motor. The conductor paths 9, 9' are guided outwardly via the bush 13 formed integrally on the lid 7. The leadframe 12 also has a metal body 14, which is a heat sink. The leadframe 12 is a copper alloy and is therefore a good conductor of heat. Due to the broader individual paths 14 compared with the conductor paths 9, the metal body 14 has a higher thermal capacity and thus an improved cooling function. The leadframe 12 is a stamped part in which the metal body 14, the conductor paths 9, 9' and the connections 15 between the individual elements 9, 9', 14 are produced by stamping. The finished leadframe 12 is produced by forming the individual elements.

Figure 3:
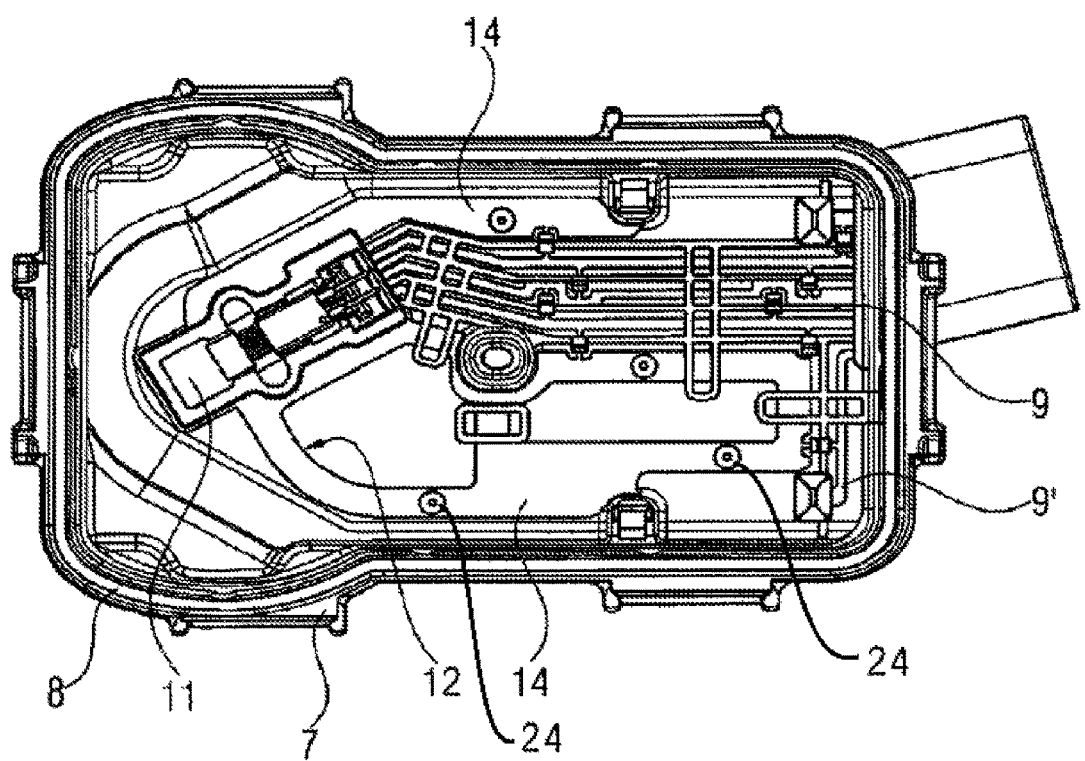
FIG. 3 is a plan view of the lid.
Figure 4:
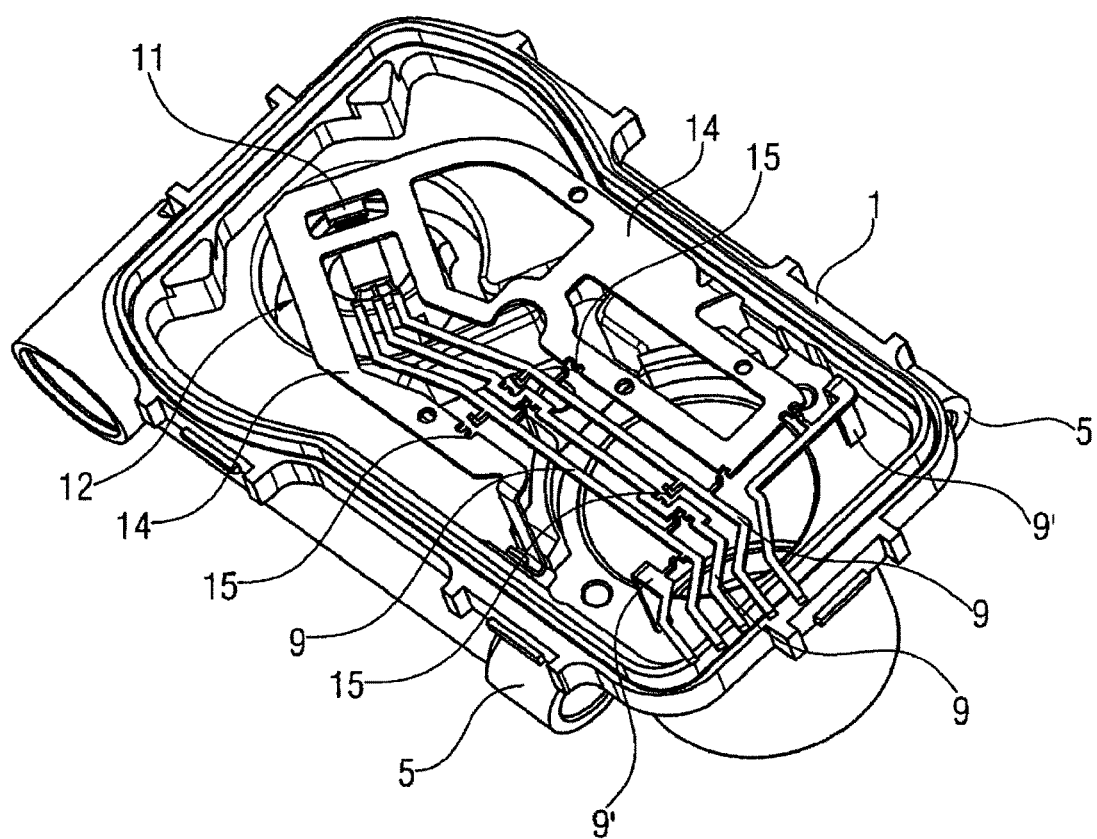
FIG. 4 is the housing without the lid.

The leadframe 12 is then clipped into latching points 24 of the lid 7, and the connections 15 are separated, such that the conductor paths 9, 9' are electrically separated. This arrangement together with the contacting of the sensor 11 is illustrated in FIG. 3. The arrangement of the metal body 14 and of the conductor paths 9, 9' to the sensor 11 and the housing part 1 is shown in FIG. 4.

Figure 5:
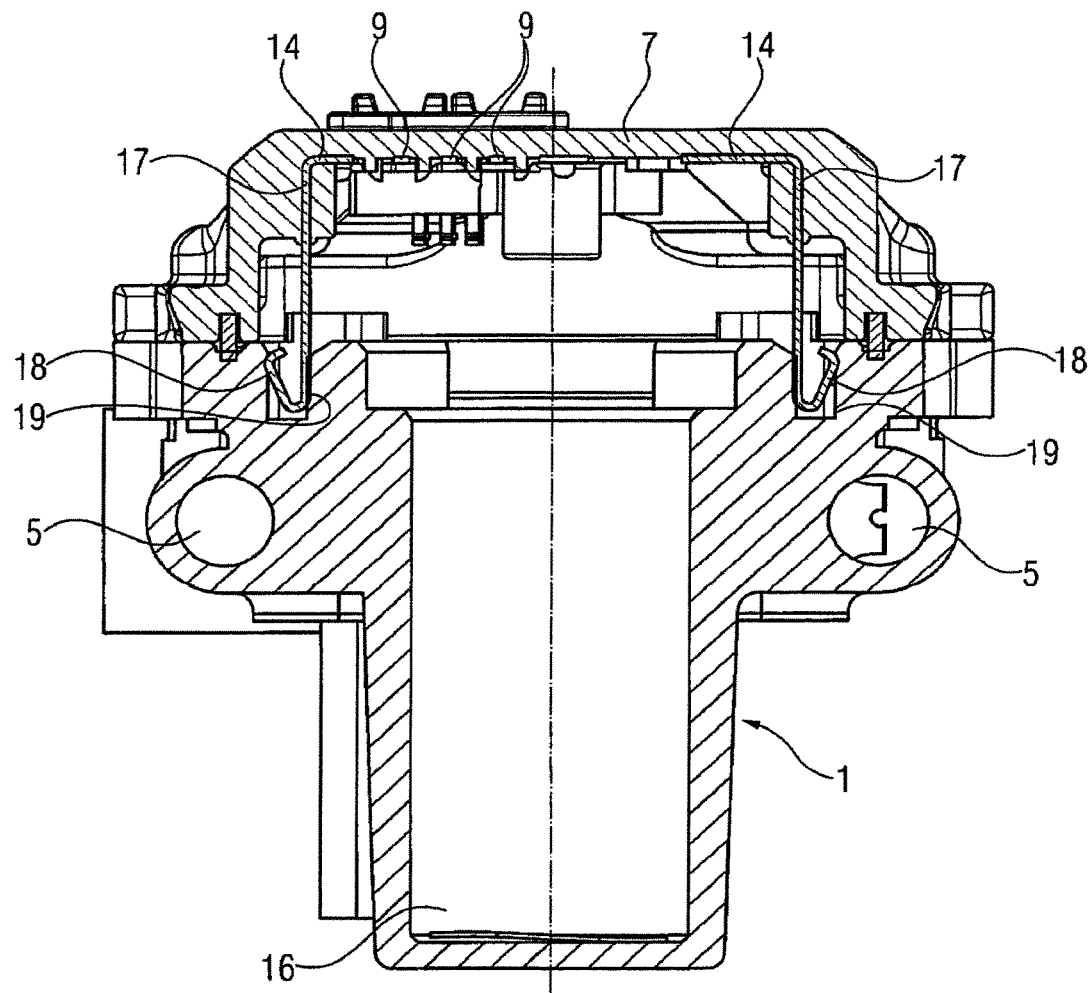
FIG. 5 is a section through the actuator.

FIG. 5 shows the housing part 1 with the coolant channels 5, the chamber 16 for the electric motor 4 and the lid 7 in section. The gear unit also is not shown for improved clarity. The conductor paths 9 are clipped in the lid, as is the metal body 14. The metal body has two webs 17, which are bent in the direction of the housing part 1 through 90° and the ends of which 18 are V-shaped. The webs 17 reach via the ends 18 thereof into receptacles 19 of the housing part 1, where they are preloaded against the wall of the receptacles 19 on account of their V-shaped design. The heat absorbed by the metal body 14 is thus dissipated via the webs 17 into the housing part 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited

The invention claimed is:

1. An actuator comprising:
   a housing having a plurality of housing parts, wherein at least one housing part is plastic and at least one housing part is metal;
   an electric motor arranged in the housing; an actuating member;
   a transmission mechanism configured to couple movement of the electric motor to the actuating member;
   an electronics system configured to control the electric motor;
   a heat sink that is a first part of a leadframe and directly connected to a region of the at least one housing part that is plastic by at least one mounting element to secure the heat sink to the at least one housing part that is plastic, the heat sink being directly connected to the metal housing part and wherein the at least one mounting element is one of a latch and a plug-in connection; and
   at least one conductor that is a second part of the leadframe configured as one or more electrical conductor paths and directly connected to a region of the at least one housing part that is plastic and configured to contact the electric motor.

2. The actuator as claimed in claim 1, wherein the at least one housing part is a plastic lid.

3. The actuator as claimed in claim 1, wherein the heat sink is a metal body.

4. The actuator as claimed in claim 3, wherein the metal body contains at least one metal having good thermal conductivity.

5. The actuator as claimed in claim 4, wherein the at least one metal having good thermal conductivity is at least one of copper and aluminum.

6. The actuator as claimed in claim 3, wherein the metal body is connected in one part to the electrical conductor paths by the plastic housing.

7. The actuator as claimed in claim 3, wherein the metal body has substantially v-shaped webs arranged in receptacles of the metal housing, wherein each leg of the substantially v-shaped web contacts a side wall of the receptacle.

8. The actuator as claimed in claim 7, wherein the webs are formed such that they are arranged in the receptacles under preload.

9. The actuator as claimed in claim 1, further comprising at least one removable connection that is a third part of the leadframe arranged between the heat sink and the at least one conductor.

\* \* \* \* \*